United States Patent Office 3,558,668
Patented Jan. 26, 1971

3,558,668
CURABLE POLYEPOXIDES FROM PHOSPHORIC ACIDS
Richard Hochreuter, Basel, and Kurt Hofer, Basel-Land, Switzerland, assignors to Sandoz Ltd., Basel, Switzerland, a corporation of Switzerland
No Drawing. Filed Jan. 30, 1969, Ser. No. 795,334
Claims priority, application Switzerland, Feb. 19, 1968, 2,372/68
Int. Cl. C08g 30/02
U.S. Cl. 260—348.6        5 Claims

ABSTRACT OF THE DISCLOSURE

The production of phosphorus containing polyepoxides is described by the reaction of ortho-, pyro- or polyphosphoric acid first with from 2 to 40 mols of ethylene oxide, then with from 2 to 6 mols of an epihalohydrin, for example epichlorohydrin or 1-chloro-2,3-epoxypropane, followed by dehydrohalogenation with an alkali, e.g. potassium or sodium hydroxide, to give the required polyepoxide. Apart from examples showing the production of three of these polyepoxides, examples are also given of providing an antistatic impregnation on textile fabrics of polyester material by coating these fabrics through immersion in an impregnating bath containing the polyepoxide—or an immediate precursor thereof in the presence of an alkali—and a hardener constituted by a polyglycoldiamine and then hardening by treating the coated fabric at a temperature of about 140 to 150° C.

SUMMARY OF THE INVENTION

The present invention provides phosphorus containing polyepoxides of the formula

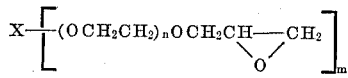

wherein

X is an ortho-, pyro- or polyphosphoric acid radical,
n is a whole number of from 2 to 40, and
m is a whole number of from 2 to 4.

The present invention also provides a process for the production of the phosphorus containing polyepoxides of the present invention, characterized in that ortho-, pyro- or polyphosphoric acid is reacted first with from 2 to 40 mols of ethylene oxide, then with from 2 to 6 mols of an epihalohydrin and subsequently dehydrohalogenation is effected with an alkali, e.g. potassium or sodium hydroxide, to give the epoxide.

The present invention also provides a resinous composition constituted by a polyepoxide of the present invention together with a hardener for a polyfunctional epoxy compound, e.g. a polyglycoldiamine.

The present invention also provides a textile material provided with an impregnation thereon constituted by a polyepoxide of the present invention hardened with a polyglycoldiamine.

Of the phosphorus containing acids suitable for use as starting material orthophosphoric acid and pyrophosphoric acid which is thought to have the following constitution:

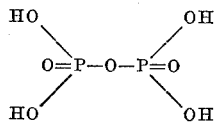

are especially suitable.

Suitable epihalohydrins are ones which contain chlorine (which is the preferred halogen), bromine or iodine, epichlorohydrin (i.e. 1-chloro - 2,3 - epoxypropane) being the preferred epihalohydrin.

The reaction of the phosphorus containing acid with ethylene oxide may be effected in the presence or absence of a catalyst, e.g. sodium phosphate or boron trifluoride, at 20 to 150° C. (preferably at 80 to 120° C.) and at atmospheric or elevated pressure. The amount of ethylene oxide to be added may vary from 2 to 40 mols per mol of the phosphorus containing acid, but, in view of the reactivity and water solubility of the end products, addition of from about 5 to about 15 mols of ethylene oxide is most suitable.

The conversion of the phosphorus containing polyglycol ester to the corresponding halohydrin ether with an epihalohydrin is effected, in manner known per se, by the reaction of the polyglycol ester with an epihalohydrin, preferably in the presence of an acid catalyst, for example boron trifluoride or tin tetrachloride, at a temperature of from 0 to 100° C., preferably from 20 to 70° C.

The dehydrohalogenation of the halohydrin ether to the epoxide is effected by the addition of an alkali, e.g. sodium or potassium hydroxide, working being suitably effected at about 0 to about 20° C. The alkali used for this purpose may be in the form of a concentrated aqueous solution, for example as 30% alkali metal hydroxide solution, or it may be in the form of powdered alkali metal hydroxide; in the last mentioned case the halohydrin ether is advantageously dissolved in a non-aqueous solvent, for example dioxan. For this purpose an amount of alkali equivalent to the amount of 1-chloro-2,3-epoxypropane or other halohydrin used has been found to be advantageous.

At room temperature the epoxy esters of the invention represent highly mobile liquids and in general water soluble products which contain 1.1 to 3.5 epoxy groups per average molecular weight. They may be hardened in manner similar to that of other polyfunctional epoxy compounds with hardeners, for example with organic bases or with di- or polycarboxylic acids or their anhydrides. The use of these products is manyfold. For example, they may be used in combination with suitable hardeners as resins or adhesives; or for fixing dyestuffs; or as auxiliaries in the textile, paper, leather or plastics industry, for example for antistatic, dirt repelling or flame retarding impregnations.

Of special interest is the use of the compounds of the invention in combination with polyglycoldiamines for the production of antistatic surface films stable to washing on synthetic fibre textile material, for example polyester fibres. For this purpose the textile material is suitably treated with a solution of the polyglycoldiamine and of the polyepoxide at room temperature or elevated temperature and drying may be effected at elevated temperature. However, it is likewise possible to apply to the textile material, in the presence of an alkali, the polyglycoldiamine together with the polyhalohydrin ether resulting as an intermediate product in the production of the polyepoxide, and to dry the resulting impregnated goods at an elevated temperature whereby antistatic effects are obtained which are similar to those obtained by the treatment indicated in the previous sentence.

The polyglycoldiamines to be used for the treatment mentioned in the last paragraph may be produced according to known methods, for example by reacting a polyglycol (e.g. polyglycol 600) with at least 2 mols of epihalohydrin in the presence of an acid catalyst, e.g. boron trifluoride, and by subsequent reaction with an alkali and at least 2 mol of ammonia.

The concentration of the polyepoxide and the polyglycoldiamine in the treatment bath may vary within wide limits. However, it is preferred to use a solution which contains a total of from about 1 to about 5% by weight of said two ingredients, their ratio to one another being preferably chosen in such a way that 1 to 3 amino groups are present for every epoxy group of the polyepoxide. The treatment of a textile material with the treatment bath is effected according to the usual methods, for example immersion, padding or spraying. After removing excess liquid, for example by squeezing, it is suitable to dry and harden the treated goods in one stage, for example during about 15 minutes at 140° C., or to dry at a relatively low temperature and to complete hardening at an elevated temperature, for example for 5 minutes at 150° C.

The heat stable surface films obtained on hydrophobic fibrous material by means of the polyepoxides of the invention and polyglycoldiamines have a very good antistatic effect. In addition, a great advantage is obtained whereby the goods treated as indicated above, on the one hand are less prone to become dirty than untreated goods and, on the other hand, dirt removal by washing is facilitated.

Polyphosphoric acid used as a starting material for the production of the polyepoxides of the present invention may be obtained by reacting orthophosphoric acid with phosphorus pentoxide in known manner and is commercially available.

The present invention also provides a polyepoxide of the formula:

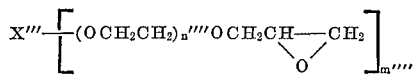

wherein

X''' is the radical or ortho- or pyrophosphoric acid, and $m''''$ and $n''''$ are such as to correspond to the presence of 1.1 to 3.5 epoxy groups per mol of calculated average molecular weight in a product obtained by reacting 5 to 15 mols of ethylene oxide for every mol of phosphoric acid and subsequently reacting the resulting reaction product with 3 to 4 mols of a halohydrin followed by dehydrohalogenation.

In the following examples parts and percentages are by weight; the temperatures are stated in degrees centigrade. Examples 1 to 3 illustrate the production of the polyepoxides of the invention and Examples A, B and C illustrate their use.

EXAMPLE 1

While introducing nitrogen, 490 g. (5 mols) of anhydrous orthophosphoric acid are melted in a four-necked flask provided with a stirrer, thermometer, reflux condenser and tube for introducing ethylene oxide and nitrogen, and 4.9 g. of a 40% ethereal solution of boron trifluoride are added at 50°. Heating to 90° is then effected, the supply of nitrogen is cut off and gaseous ethylene oxide is introduced. After about 48 hours a total of 2200 g. (50 mols) of ethylene oxide have reacted with the phosphoric acid, whereupon no further ethylene oxide becomes added and the reaction vessel is rinsed out with nitrogen.

2690 g. of a slightly brownish, viscous product (I) are obtained which has an acid number of 8.7.

1076 g. (2 mols) of the product (I) are mixed at about 30° with 10.7 g. of a 40% solution in ether of boron trifluoride and 555 g. (6 mols) of epichlorohydrin are added dropwise while stirring during 1 hour. Subsequently stirring is continued for 2 hours at 30 to 35°, warming is then effected to 60°, stirring is carried out for one hour longer, the pressure is reduced to 15 to 20 mm. of Hg, whereby a small amount of unreacted 1-chloro-2,3-epoxy-propane is distilled off. In this way 1596 g. of polychlorohydrin ether (II) as a slightly brownish, viscous liquid are obtained; this material contains about 2.75 chlorohydrin ether radicals per mol of the product I of this example.

399 g. (0.5 mol) of the compound (II) are dissolved in 250 ml. of dioxan and 66 g. (1.65 mols) of powdered sodium hydroxide are added portionwise to the solution at 18–20° while stirring. Stirring is continued for a further 5 hours, filtering is effected and evaporation in a vacuum at 30 to 40°. 335 g. of polyepoxide (III) are obtained in the form of a clear, slightly yellowish viscous liquid with 1.9 equivalents of epoxy groups per mol of calculated average molecular weight.

EXAMPLE 2

In manner similar to Example 1 294 g. (3 mols) of crystalline orthophosphoric acid are melted after the addition of 1.5 g. of 40% ethereal solution of boron trifluoride and reaction with ethylene oxide at 100° is effected. After 15 hours, 792 g. (18 mols) of ethylene oxide have become added to the phosphoric acid. In this way 1084 g. of a product (I) in the form of a weakly brownish, viscous liquid are obtained which requires a further 0.58 mol of base per mol of average molecular weight in order to neutralize.

362 g. (1 mol) of the product (I) are warmed to 70° after the addition of 1.8 g. of a 40% boron trifluoride solution in ether and during the course of 1 hour 277.5 g. (3 mols) of 1-chloro-2,3-epoxypropane are added. The reaction mixture is stirred for a further 30 minutes and evacuation is then effected to 140 to 145 mm. of Hg. During that time no unreacted 1-chloro-2,3-expoxypropane can be observed to distill off and cooling is allowed to take place. The resulting polychlorohydrin ether (II) is present in the form of a slightly brownish, viscous liquid.

During about 30 minutes 40 g. of a 30% aqueous sodium hydroxide solution are added dropwise, while stirring and cooling to 10 to 12°, to 64 g. (0.1 mol) of the chlorohydrin ether (II) obtained according to the above procedure. After the reaction mixture has been stirred for a further 2 hours at about 10°, precipitated salt is filtered off. 87 g. of an almost colourless, slightly cloudy product (III) are obtained which contains 1.5 equivalents of epoxy groups per mol of calculated average molecular weight (530).

EXAMPLE 3

After 1.8 g. of a 40% ethereal solution of boron trifluoride had been added, 178 g. of pyrophosphoric acid are heated to 98–100° while introducing nitrogen. After that temperature had been reached, the nitrogen supply is cut off and gaseous ethylene oxide is introduced until a total of 660 g. (15 mols) of ethylene oxide have become added to the pyrophosphoric acid; this addition takes about 24 hours.

The resulting pyrophosphoric acid polyglycol ester (I) is constituted by a slightly brownish, viscous liquid and has an acid number of 8.1.

After the addition of 1.7 g. of ethereal boron trifluoride solution to 167.5 g. (0.2 mol) of the pyrophosphoric acid polyglycol ester (I), 74 g. (0.8 mol) of 1-chloro-2,3-epoxypropane are added at 32° during 1 hour while stirring. Stirring for a further 2 hours at 31 to 34° is effected and heating for 1 hour at 60° is then effected. The reaction vessel is then evacuated to 13 to 14 mm. of Hg, whereby about 2 ml. of distillate is removed. 233 g. of polychlorohydrin ether (II) result as a light brownish viscous liquid; by the addition of 1.4 ml. of 30% aqueous sodium hydroxide solution the pH value of the product is brought to 7.

117.5 g. (0.1 mol) of the polychlorohydrin ether (II) obtained according to the above procedure are cooled to 8 to 10° and 46 g. (0.345 mol) of 30% sodium hydroxide solution are added dropwise during 1 hour while stirring. The temperature of the reaction vessel is then allowed to rise to 25 to 30° during 2 hours, stirring for 1 hour at that temperature is continued and precipitated sodium chloride is then filtered off. The resulting polyepoxide (III) is present in the form of a highly concentrated, brownish, aqueous solution with 1.98 equivalents of epoxy groups per mol of calculated average molecular weight.

EXAMPLE A

An impregnation bath is prepared containing per litre 10.5 parts of the polyepoxide (III) obtained according to Example 1 and 22.5 parts of a polyglycoldiamine solution obtained according to the following procedures: First the bischlorohydrin ether is produced from 600 g. of a polyethylene glycol having an average molecular weight of 600 after the addition of 6 g. of tin tetrachloride by reaction with 185 g. (2 mols) of 1-chloro-2,3-epoxypropane at 70 to 72°; after reducing the pressure to 145 to 150 mm. of Hg and dissolving this material in 790 ml. of water at 8 to 10°, conversion to the epoxide is effected by the dropwise addition of 254 g. of a 30% sodium hydroxide solution, subsequent conversion into the polyglycoldiamine being effected by adding 272 g. of a 25% ammonia solution; the excess of ammonia is then removed at 70° under reduced pressure and the polyglycoldiamine content is brought to 50% by the addition of water.

A fabric of polyester fibre material is padded in this impregnation bath with a liquor ratio of about 1:50 at 20–25° and squeezing to a weight increase of 110 to 120% is effected. After drying for 15 minutes at 140°, a fabric is obtained with an antistatic impregnation which is fast to washing. Furthermore, the capacity to become dirty of this fabric is lowered by this treatment and removal of dirt therefrom is facilitated.

Similar antistatic effects are likewise obtained when, instead of polyester fabrics, polyacrylonitrile, polyamide, or polyolefin fabrics are treated with the above mentioned impregnating solution.

EXAMPLE B

A prewashed fabric of polyester fibre material is padded in an impregnating bath with a liquor ratio 1:50 which bath contains per litre 17.5 g. of the polyepoxide (III) obtained according to Example 2 and 30 g. of the polyglycoldiamine solution mentioned in Example A. The fabric is squeezed to a weight increase of about 120% and then dried for 15 minutes at 135 to 140° on a tensioning frame.

The treated fabric shows a very good antistatic effect which remains even after several washings with, for example, 5 g./litre of soap and 2 g./litre of anhydrous sodium carbonate during 30 minutes at 60°. Furthermore, the treated fabric, as compared with untreated fabric, shows an appreciably improved ability to be freed of dirt by washing.

EXAMPLE C

A prewashed woven fabric of polyester fibre material is treated at a liquor ratio of 1:50 at 20° with an aqueous solution containing per litre 22.5 g. of the polyepoxide (III) obtained according to Example 3 and 30 g. of the polyglycoldiamine solution mentioned in Example A. Squeezing to a weight increase of about 120% is effected, the fabric is dried for 10–15 minutes at 140°.

The treated fabric shows a very good antistatic effect which is stable to washing, and has dirt repelling properties.

Similar effects are likewise obtained when, instead of the 22.5 g. of polyepoxy compound mentioned, there are used 6.4 g. of the polyglycolchlorohydrin ether (II) mentioned in Example 2 while simultaneously adding 3.7 ml. of a 30% aqueous sodium hydroxide solution, the remaining procedure being as described above.

Although the present invention is described herein with particular reference to specific details, it is not intended that such details shall be regarded as limitations upon the scope of the invention except insofar as included in the accompanying claims.

We claim:

1. A polyepoxide obtained by reacting one mol of a phosphoric acid selected from ortho- and pyrophosphoric acid with (a) 2 to 40 mols inclusive of ethylene oxide, then (b) 2 to 6 mols inclusive of an epihalohydrin and (c) dehydrohalogenating the halohydrin thus obtained by treatment with alkali.

2. A polyepoxide according to claim 1 obtained by reacting one mol of ortho-phosphoric acid with (a) 10 mols of ethylene oxide, then (b) 3 mols of epichlorohydrin and (c) dehydrochlorinating the chlorohydrin thus obtained by treating it with sodium hyroxide.

3. A polyepoxide according to claim 1 obtained by reacting one mol of ortho-phosphoric acid with (a) 6 mols of ethylene oxide, then (b) 3 mols of epichlorohydrin and (c) dehydrochlorinating the chlorohydrin thus obtained by treating it with sodium hydroxide.

4. A polyepoxide according to claim 1 obtained by reacting one mol of pyrophosphoric acid with (a) 15 mols of ethylene oxide, then (b) 4 mols of epichlorohydrin and (c) dehydrochlorinating the thus obtained chlorohydrin by treating it with sodium hydroxide.

5. A polyepoxide according to claim 1 obtained by reacting one mol of a phosphoric acid selected from ortho- and pyrophosphoric acid with (a) 6 to 15 mols inclusive of ethylene oxide, then (b) 3 to 4 mols of an epihalohydrin and (c) dehydrohalogenating the halohydrin thus obtained by treating it with alkali.

References Cited

UNITED STATES PATENTS

| | | | |
|---|---|---|---|
| 2,372,244 | 3/1945 | Adams et al. | 260—461 |
| 2,974,066 | 3/1961 | Macura et al. | 117—139.5 |
| 2,826,592 | 3/1958 | Marcura et al. | 260—348 |
| 3,108,011 | 10/1963 | Frotscher et al. | 117—62.2 |
| 3,170,877 | 2/1965 | Beiswanger et al. | 252—8.8 |
| 3,154,429 | 10/1964 | Albrecht et al. | 117—139.5 |
| 3,281,502 | 10/1966 | Pelletier et al. | 260—920 |

WILLIAM H. SHORT, Primary Examiner

E. NIELSEN, Assistant Examiner

U.S. Cl. X.R.

117—138.8, 139.5, 142, 155, 161; 156—330; 260—2